United States Patent [19]

Roberts

[11] 4,374,892
[45] Feb. 22, 1983

[54] MOISTURE RESISTANT INSULATING MICA TAPE COMPRISING A MONOALKOXY TITANATE

[75] Inventor: Jonathan W. Roberts, Raymond, N.H.

[73] Assignee: Essex Group, Inc., Fort Wayne, Ind.

[21] Appl. No.: 270,174

[22] Filed: Jun. 3, 1981

[51] Int. Cl.$^3$ .................. B32B 5/24; B32B 19/04; B32B 19/06; B32B 27/32

[52] U.S. Cl. .................. 428/233; 428/241; 428/247; 428/251; 428/286; 428/324; 428/428; 428/441; 428/480; 428/521

[58] Field of Search .............. 428/247, 251, 241, 233, 428/286, 324, 428, 441, 480, 521

[56] References Cited

U.S. PATENT DOCUMENTS

| | | |
|---|---|---|
| 2,562,004 | 7/1951 | Watson et al. |
| 2,835,642 | 5/1958 | Safford |
| 2,948,640 | 8/1960 | Corrin |
| 4,157,414 | 6/1979 | Smith |
| 4,286,010 | 8/1981 | Staley et al. .................. 428/241 |

Primary Examiner—James C. Cannon
Attorney, Agent, or Firm—Harry J. Gwinnell

[57] ABSTRACT

An electrical insulation tape is disclosed comprising a sheet of mica paper impregnated with a B-staged polybutadiene polymer, a woven glass scrim next to the mica paper, a block copolymer sealing layer next to the glass scrim and optionally a polymeric sealing layer next to the mica. It has been found that the inclusion of about 0.1% to about 0.35% by weight of an organo titanate containing long saturated chains or reactive functional groups impregnated into the mica not only improves the moisture resistance of the tape, and therefore its useful life, but improves the dissipation factor as well.

7 Claims, 3 Drawing Figures

MOISTURE RESISTANT INSULATING MICA TAPE COMPRISING A MONOALKOXY TITANATE

TECHNICAL FIELD

The field of art to which this invention pertains is composite insulation material with structurally defined elements including impregnation or bond.

BACKGROUND ART

Due to the excellent thermal and electrical insulation properties of mica, it lends itself readily to use in such things as electrical insulation tape. Synthetic and natural mica can be split into thin flexible platelets which, when laid on a paper making machine overlap each other, thus forming a continuous sheet of an integrated type of mica paper. Generally, this is done by forming a slurry of the mica platelets and depositing them on a continuous belt with subsequent extraction of the water by vacuum.

Such paper is quite flimsy and easily flaked, with a tensile strength of approximately 2 to 8 pounds per inch (357.2 to 1428.8 grams per cm) of width. The only adhesive at this point is a result of the intimate contact between the smooth surfaces of the mica platelets which allows the short range Van der Waal forces to provide a cohesive bond between adjacent surface molecules. The incorporation of a polar solvent tends to disrupt the platelet orientation and in excess will return the mica to slurry form. Accordingly, further processing is necessary to provide reinforcement. Normally, this requires the impregnation of the mica paper with a resin, lamination of plies of the mica paper together, or the addition of a backing substrate to the mica paper. Note U.S. Pat. Nos. 2,562,004; 2,835,642; 4,157,414; and commonly assigned, copending U.S. patent application Ser. No. 82,250, filed Oct. 5, 1979, now U.S. Pat. No. 4,286,010, which disclose the coating and lamination of mica paper in the manufacture of electrical insulation, the disclosure of which is incorporated by reference.

Since polymer promoted adhesion is such an important factor in forming insulating mica sheets, the ability of the polymer to efficiently contact and wet the surface of the mica sheets becomes very important. The more intimate contact the liquid resin makes with the irregularities of the mica surface, the greater will be the final adhesive bond. On the other hand, poor wetting of the mica sheets tends to produce a greater stress concentration at the free surface of the adhesive where failure is most likely to be initiated. This is due to the stress concentration being much higher in the mean stress across the mica sheet. In addition, when water reaches the microscopic voids, migration proceeds through capillary action. Since water can effectively wet out the mica surface, the results are lowered surface energy and propagation of interfacial separation.

The shingle-like configuration of the mica paper decreases the percentage of platelet surface areas which come into contact with each other. Another factor which reduces contact is the adherent edge frame of the platelets themselves. Small edge pieces deviating from the plane of the surface are a product of the initial water jet delamination process of the block mica. Foreign particles such as sand, which may be carried through the wash process, also impose separation between platelets. As a result, the mica sheet substrate whose volume can consist of between 40% to 50% random void spaces and irregular plane dimensions does not readily lend itself to intimate contact by bulky polymers.

From an electrical insulation viewpoint, the presence of voids in a high-voltage system allows these voids to become sites for internal ionization and subject to intense corona discharge. This leads to an increase in the dissipation factor "tip-up" characteristics and in some cases, can even result in the generation of internal heat above normal operating temperatures. This in turn, accelerates the thermal degradation of the resin system and ultimately reduces the life of the insulation.

Attempts at improving physical properties of mica sheets have included such things as treatment of mica paper with organo titanates (note U.S. Pat. No. 2,948,640). And in fact, mica sheet-containing toaster boards treated with silicone resin and organo titanates to improve moisture resistance have been on the market for years. However, the application of this technology to mica insulation tapes has been noticeably absent from this art.

Because of the constant changes in the electrical insulation industry and the size and output of various motor systems, there exists a constant search for insulation systems which will increase operating temperatures of the various motors produced without sacrificing efficiency. A system which would overcome the above noted problems would represent a definite advancement in this art.

DISCLOSURE OF INVENTION

An electrical insulation tape is disclosed comprising a sheet of mica paper impregnated with a B-staged polybutadiene polymer and about 0.1% to about 0.35% by weight based on the weight of mica present of a monoalkoxy titanate. The insulation tape also includes a woven glass scrim next to the mica paper, a block copolymer sealing layer next to the glass scrim, and a sealing layer next to the mica. It has surprisingly and unexpectedly been found that not only does the inclusion of the titanate improve moisture resistance, but within the defined range significantly improves dissipation factor as well.

Another aspect of the invention includes the electrical insulation tape described above, but with the elimination of the sealing layer next to the mica and the inclusion of a layer of release paper next to the mica paper on that side of the tape opposite the glass scrim.

The foregoing, and other features and advantages of the present invention will become more apparent from the following description and accompanying drawing.

BEST MODE FOR CARRYING OUT THE INVENTION

Figure 1:
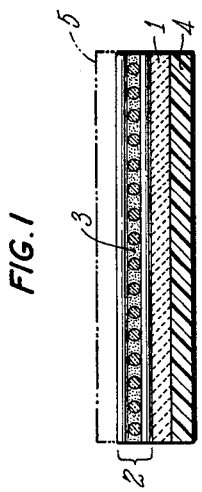
FIG. 1 represents schematically a tape according to the present invention.

While any conventional mica can be used in the present invention in paper formed in any desired thickness, muscovite, because of its dielectric strength, in thicknesses up to 10 mils and especially about 1.8 to 10 mils is preferred. Phlogopite is another mica of note because of its outstanding high temperature properties.

As the B-staged hydrocarbon polymer, the polybutadienes, because of their outstanding electrical properties, are preferred. Specifically, the Lithene ® A series (Lithium Corporation of America) of polybutadienes of high molecular weight (e.g., in excess of about 900 and especially in excess of about 1800 weight average molecular weight) containing the following groups are preferred:

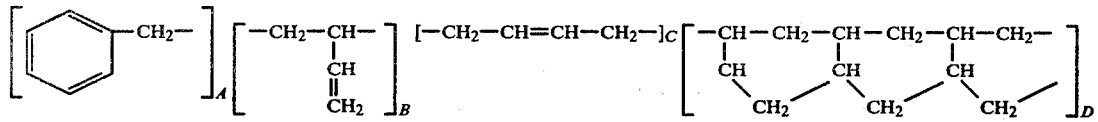

The preferred polybutadiene polymer comprises by weight about 5% terminal phenyl groups (A), about 38% to about 47.5% of the 1,2 vinyl component (B), about 9.5% to about 19% of the 1,4 component (C) in trans- form and about 4.75% to about 9.5% of the 1,4 component in the cis- form, and about 28.5% to about 38% of the cyclized component (D).

While any conventionally employed reinforcing backing can be used for the mica tape of the present invention such as non-woven glass mats or glass strips or fiber, woven glass mats such as Cloth Styles 2121 and 1297 provided by Burlington Glass and J. & P. Stevens are particularly preferred. The third and fourth components of the tape can be used in combination or alternatively. To insure that the mica-polybutadiene impregnant does not migrate out of the tape during processing, storing and subsequent handling, polymeric sealing layers are applied to both sides of the impregnated mica paper-glass scrim composite. The preferred sealing layer on the glass scrim side of the tape is a styrene-butadiene or isoprene-butadiene A-B-A block copolymer. The Kraton ® series of such polymers (Shell Oil Company) are preferred (e.g., Nos. 1101, 1102 and 1107) and Kraton 1107 especially preferred. The preferred sealing polymer on the mica side of the tape is a polyester film such as Mylar ® (DuPont DeNemours and Co., Inc.). In addition to the stytrene- or isoprene-butadiene block copolymer, another polymer layer such as the Mylar on the glass scrim side of the tape can also be used. Again, the key is sealing of the mica impregnant and securing the glass scrim. The polyester layer not only serves as a backing for the mica and glass scrim, but has excellent insulating properties as well. Furthermore, it imparts improved extensible properties to the tape, i.e. allows the tape to be wrapped, twisted and bent while maintaining its exceptional tape integrity.

In the process of making tapes of the present invention, after impregnation of the mica-glass scrim with the polybutadiene, a light coating of the compatible sealing polymer (e.g., block copolymer) is applied to the composite, e.g. with a kiss roller. While the amount of the sealing polymer applied in this manner can be varied, sufficient amount should be applied as stated above to prevent squeeze out of the polybutadiene and displacement of the glass scrim during rolling, slitting, rerolling, storage, and handling of the mica tape. This sealing polymer is believed to represent about 15 to about 25 weight percent of the total polymer content of the tape. It should also be noted than an embodiment of the present invention includes two layers of polyester, one on either side of the tape.

The principal embodiment of the tapes according to the present invention are as shown in FIG. 1, including a sheet of mica paper (1) impregnated with a mixture of 10% to 35% by weight of a B-staged polybutadiene polymer and about 0.1% to 0.35% by weight (based on the weight of the mica present) of the organo titanate; a woven glass scrim next to the mica paper (2); a block copolymer sealing layer of isoprene-butadiene or styrene-butadiene (or mixtures thereof) next to the glass scrim (3); and a polyethyleneterephthalate film sealing layer next to the mica on that side of the mica opposite the glass scrim (4). An additional layer of polyethyleneterephthalate (5) can be included next to the block copolymer sealing layer.

Another embodiment of the present invention includes the use of a mat of non-woven fibers such as Dacron ® polyester or beta-glass (small diameter, non-skin-irritating glass fibers) of the same relative thickness as the polyethyleneterephthalate (Mylar ®) film backing layer in place of at least one of the Mylar layers. This is accomplished by coating e.g. the polyester mat with a sealing layer such as Kraton 1107. This combination produces a film which blocks the migration of the B-staged polybutadiene polymer. However, this mat should be used with a heavy dusting of mica on the backside of the mat, the side opposite the mica paper, sufficient to prevent layers of the insulation tape so constituted from sticking to each other when rolled up.

In addition, a tape can be so constructed which completely eliminates the need for either the polyester mat or the polyethyleneterephthalate film. In this embodiment, the mica paper impregnated with the polybutadiene and organo titanate is also impregnated on the glass scrim side of the tape with the sealing layer. A separator sheet such as Kraft paper is then applied to the tape on the mica paper side of the tape so that it releases when the product is unwound and discarded. The resulting product consists of mica paper and a glass scrim adhered to it. Again, the bulk of the polybutadiene is in the mica paper and the Kraton acts as the glass to mica adhesive. Optionally, mica dust can be applied to the top of the Kraft paper to assist in unrolling.

The organo titanate is preferably admixed with the resin prior to impregnation into the mica. Uniform mixing is important to attain the results of the present invention, since the organo titanate chemical moieties interact so specifically with the polymer moities to produce the improved properties according to the present invention.

Three samples were prepared to demonstrate the improved properties resulting from the addition of the organo titanate in the narrow range described. The resins used in the tapes tested were a polybutadiene resin and a styrene-isoprene-styrene thermoplastic block copolymer sealing layer. Approximately 75% by weight of the total resin in the tape was the polybutadiene resin and approximately 25% was the styrene-isoprene-styrene block copolymer. The tape sample was constructed by utilizing a polyethyleneterephthalate layer next to the mica paper, which was next to a glass scrim. The polymer coatings were applied through the glass scrim. In the tapes tested, the polyethyleneterephthalate in mat form was 0.0014 inch (0.0036 cm) thick, the mica layer 0.006 inch (0.015 cm) thick, and the glass scrim 0.002 inch (0.005 cm) thick, although thicknesses can vary according to design considerations.

The polybutadiene resin was applied with the use of a brush and the resin passed through the glass scrim into the mica paper. This was followed by coating the copolymer in the same manner. Sample 1 contained no organo titanate. Sample 2 contained KR 33CS organo titanate and Sample 3 contained KR 38S organo titanate. KR 33CS is an isopropyl-trimethacryl titanate and KR 38S is an isopropyl-tri(dioctyl pyrophosphato) titanate, both products of Kenrich Petrochemicals, Inc. (Bayonne, N.J.). These are the preferred alkoxy organo titanates for use in the present invention and most preferred is a 50% by weight admixture of the two.

Immersion testing of the three samples for ten minutes indicated the following results. For sample 1, with no organo titanate, water pick-up ranged from 5.9% to 39.4% for all of the samples tested, with the average pick-up 21.8% by weight based on weight of the tape. For the sample containing the KR 33CS organo titanate, the range was 0.28% to 0.64% with an average weight of 0.44%. For Sample 3, containing the KR 38S organo titanate, the range was 0.14% to 0.23% with an average value of 0.17%. Thus, the water resistance can clearly be seen to be significant with the titanate loading as described.

TABLE 1

| Applied Voltage | Dissipation Factor @ 155° C. ASTM D-150 | | |
|---|---|---|---|
| Volts/Mil | Sample 1 | Sample 2 | Sample 3 |
| 10 | .032 | .034 | .035 |
| 20 | .032 | .034 | .035 |
| 30 | .032 | .034 | .036 |
| 40 | .032 | .035 | .036 |
| 50 | .033 | .035 | .036 |
| 60 | .033 | .035 | .036 |
| 70 | .033 | .035 | .037 |

TABLE 2

| Applied Voltage | Dissipation Factor @ 155° C. ASTM D-150 | | |
|---|---|---|---|
| Volts/Mil | Sample 1 | Sample 2 | Sample 3 |
| 10 | .0051 | .0049 | .0048 |
| 20 | .0052 | .0049 | .0048 |
| 30 | .0052 | .0049 | .0049 |
| 40 | .0053 | .0050 | .0050 |
| 50 | .0053 | .0050 | .0050 |
| 60 | .0055 | .0051 | .0052 |
| 70 | .007 | .0051 | .0054 |

TABLE 3

| | Percent Weight Change | | |
|---|---|---|---|
| Hours @ 180° C. | Sample 1 | Sample 2 | Sample 3 |
| 22.5 | +0.085% | +0.025% | +0.097% |
| 115.25 | −0.65 | −0.58 | −0.58 |
| 209.25 | −1.15 | −1.07 | −0.97 |
| 373.25 | −1.53 | −1.45 | −1.40 |
| 466.25 | −1.69 | −1.66 | −1.54 |
| 491.25 | −1.77 | −1.72 | −1.63 |

Multi-ply laminates of tapes according to the present invention formed by taking the single-ply laminates described above and placing two of them together and hot pressing at 20 psi ($1.38 \times 10^5$ NT/M$^2$) for four hours at 300° F. (149° C.) were as follows. In these tests, 2 inch (5 cm) by 4 inch (10 cm) samples of the laminates were submerged in distilled water for 16.5 hours. Water weight gain was measured. Laminates made from sample 1 with no organo titanate, showed a 21.3% weight increase. Laminates made from sample 2 showed a 0.4% weight increase, and laminates made from sample 3 showed a 1% increase.

Surprisingly, the inclusion of the organo titanates also had a significant improvement on the dissipation factor. Although this did not show up under initial testing at 155° C. (note Table 1), after heat aging for approximately 491.25 hours at 180° C., the beneficial effects of the titanate became apparent (note Table 2).

Figure 2:
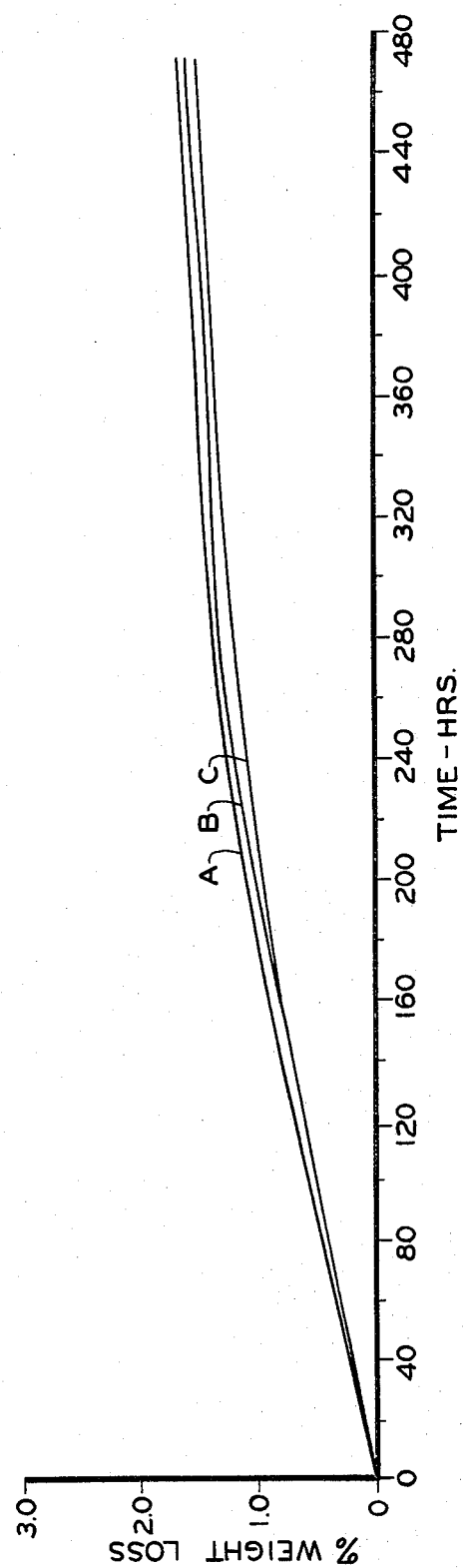
FIG. 2 is a graph of percent weight loss vs. time of a tape according to the present invention.

Four inch (10 cm) square samples of the laminate were weighed, placed in a 180° C. oven, and periodically weighed to determine weight loss. This was to determine if the organo titanates would produce any detrimental results. Note Table 3. As can be seen from the results of the Table, the organo titanates actually had a beneficial effect on the weight loss of the laminates. This is also shown in FIG. 2 where A is sample 1, B is sample 2, and C is sample 3.

As stated above, the amount of organo titanate added to the system is critical for attaining the improved moisture resistance and dissipation factors described. It is believed that the reason for this is as follows. The titanates react with the free protons on the surface of the inorganic filler, i.e. the mica. In addition, the titanate molecules have a second functional group which can react with the polymer being used as the bonding agent. This, therefore, creates a bonding bridge between the filler and the polymer. In the case of a monoalkoxy titanate, the alkoxy portion of the titanate will react with the free proton provided by the inorganic mica resulting in the liberation of isopropyl alcohol. The functional groups on the titanate in turn, interact with the polymer. Depending on which titanate has been selected for the application, that selection will determine how it interacts with the polymer. For example, if a thermoplastic titanate such as KR 38S is used with thermoplastic resin such as Kraton 1107, then the mechanism is believed to be one in which the saturated long chains of the titanates provide for Van der Waal entanglement.

Some titanates contain functional groups which can coreact with thermosetting resins. For example, KR 33CS contains three methacrylic groups. The number of acrylic or methacrylic groups attached to the titanate can be varied through the selection of the available titanates and can be balanced with the desired degree of crosslink density. Therefore, it can be seen that the titanates offer a means of providing compatibility between the organic and inorganic phases at the bonding surfaces. The ability of the titanates to form a monomolecular layer at this interface promotes the wetting characteristics of the polymer. The problem of void formation at the interface due to the poor surface wetting is thus dramatically reduced.

It is also believed that due to the titanate coupling action, there is less tendency for the polymer to shrink away from the surface of the inorganic substrate. If the polymer tends to lift away from the interface, then the formation of voids is promoted. It is believed that this is a result of the polymer molecules having a greater attraction for one another than exhibited by the polymer molecules and the inorganic mica substrate. As a result, the polymer tends to pull away from the mica substrate, leaving void areas. The effects of the void formation is reflected by poor moisture resistance. In effect, the microscopic voids provide a route for the migration of the water.

It is also important that the correct level of titanate be used because of the high voltage environment the mica tapes according to the present invention will be used in. It is believed that the unreacted alkoxy groups which are provided by the titanate will tend to increase the electrical conductivity and, therefore, effect the dissipation factor. Accordingly, correct selection of titanate amounts must be established. Another consideration is the surface area being treated. The available surface protons will vary in proportion with the available surface area. This is particularly pertinent for the mica insulation where the mica surface area will vary depending on the application. For example, if the concentration of titanate has been established using an integrated type of mica paper, then one would expect that more titanate would be needed to treat a fine type of mica paper, since its surface area could be ten times as high. This relationship may not be directly proportional due to considerations such as steric hindrance. When mica flakes of a larger size are used, one would expect to use less titanate. Therefore, each application must be individually screened. The final concentration should be based on percent of titanate based on weight of the inorganic (mica) present.

Figure 3:
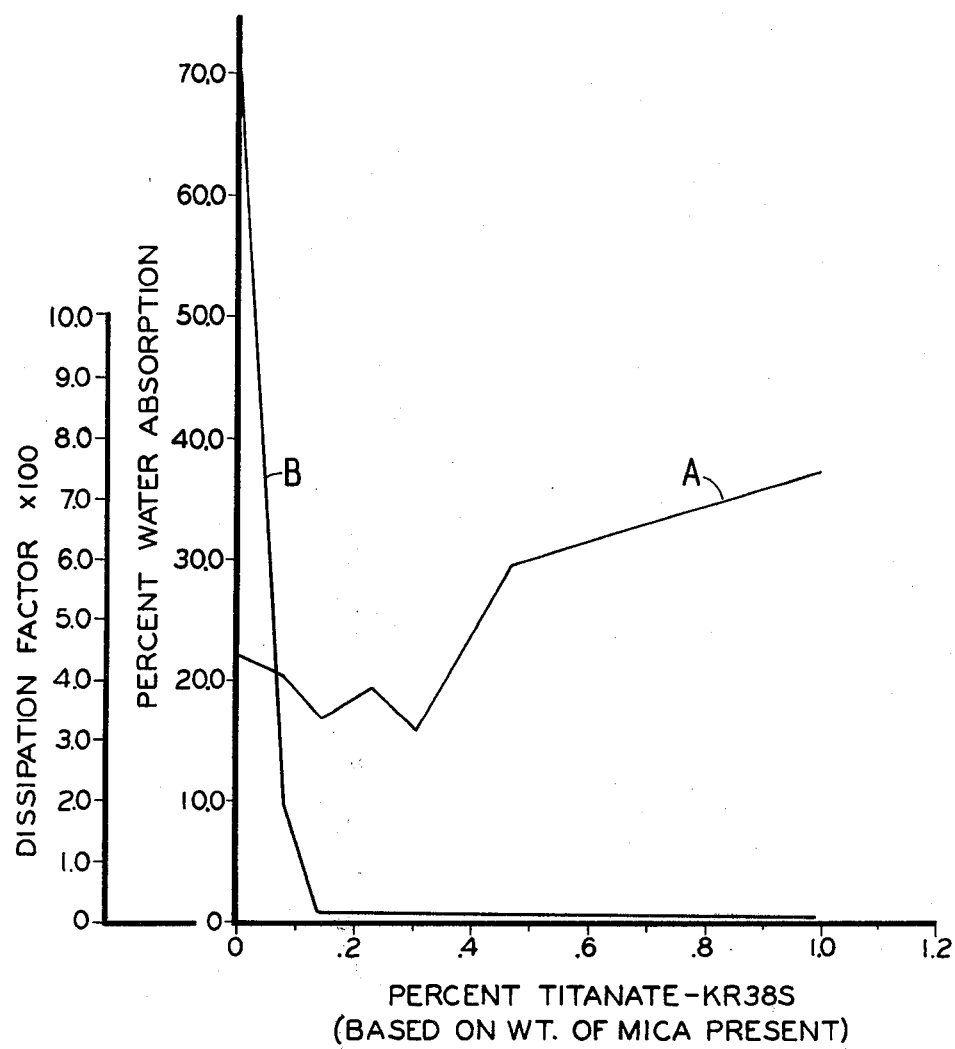
FIG. 3 is a graph of percent water absorption and dissipation factor as a function of percent titanate in a tape according to the present invention.

The following tests were performed to establish the critical range of titanate level necessary to accomplish the improved results according to the present invention. The mica paper tape was constructed as in the preceding experiments except that the polyester mat and butadiene polymer were excluded as unnecessary for determining the moisture resistance and dissipation factors of the mica containing insulation according to the present invention. Titanate levels were increased in the individual samples as demonstrated in FIG. 3, where A is the dissipation factor at 100 volts per mil at 155° C. (testing performed in accordance with ASTM D-150), and B is percent water absorption. The water absorption testing was performed on 2 inch (5.08 cm) square samples which were immmersed edgewise a depth of 0.125 inch (0.318 cm) in distilled water for 10 minutes. The samples were weighed before and after immersion and the percent water absorption calculated based on the weight of the sample. Five samples were tested for each measurement and the average value taken.

The graph (FIG. 3) illustrates that a dramatic improvement in moisture resistance is exhibited by the addition of a very small quantity of titanate, e.g. approximately 0.08% by weight. However, additions in excess of 0.14% by weight appear to add little to the moisture resistant properties. Similarly, titanate levels in excess of approximately 0.35% by weight begins to produce a detrimental effect on dissipation factor. Therefore, the critical titanate range for tapes according to the present invention can be seen to be between about 0.1% and about 0.35% by weight based on total weight of the mica present in the tape. The preferred level is about 0.2% by weight. Although this percentage range is critical for attaining the moisture resistance and dissipation factor of the improved insulation tapes according to the present invention, if one were willing to suffer either a lesser moisture resistance or a greater dissipation factor, of course amounts outside this range could be used.

Testing was also performed to demonstrate the improved insulating properties of a mica tape according to the present invention on an actual coil nose. The coil nose was cut from a 2200 volt coil and the copper strands exposed to provide an electrical contact. The same coil nose was used for each experiment. The coil nose was dried for 15 minutes at 300° F. (149° C.) and allowed to cool. Using the mica tape according to the present invention, the coil nose was hand wrapped with one-half lap wrapping with one layer of 0.75 inch (1.9 cm) wide tape. A heat shrink Mylar tape was applied to the taped coil to provide some uniform pressure during the curing cycle. The taped coil was placed in an air-circulating oven for one hour at 300° F. (149° C.). It was removed from the oven and allowed to cool for 15 minutes, at which time the heat shrink tape was stripped off. The coil nose was placed in a 4000 ml beaker. Five hundred volts direct current was passed through the coil nose at which point it was totally immersed in water in the beaker. Failure was taken to be the time that the insulation resistance dropped by two decades. Most coils went almost to zero quickly at failure. Time to failure was recorded. Repeated tests showed 15, 18, 17, 2 and 4 minutes for the controls containing no titanate; and 22, greater than 60, greater than 60, 6 and 9 minutes for the titanate containing tape. In a more dramatic demonstration, two samples which failed at 5 and 4 minutes under control went for 150 and 190 minutes to failure with the addition of organo titanate. (The lower figures at 6 and 9 minutes for the titanate containing tapes are believed to result from improper hand wrapping of the samples, i.e. underlapping).

Although this invention has been shown and described with respect to detailed embodiments thereof, it will be understood by those skilled in the art that various changes in form and detail thereof may be made without departing from the spirit and scope of the claimed invention.

I claim:

1. An electrical insulation tape comprising a sheet of mica paper impregnated with a B-staged polybutadiene polymer, a woven glass scrim next to the mica paper, a block copolymer sealing layer next to the glass scrim, and a polyethyleneterephthalate sealing layer next to the mica, wherein the improvement comprises:
   including about 0.1% to about 0.35% by weight based on the weight of mica present of a monoalkoxy titanate in the mica sheet to improve moisture resistance and dissipation factor.

2. The electrical insulation tape of claim 1 including multiple plies of the recited layers.

3. An electrical insulation tape comprising a sheet of mica paper impregnated with a mixture of B-stage polybutadiene polymer and about 0.1% to about 0.35% by weight based on the weight of mica present of a monoalkoxy titanate, a woven glass scrim next to the mica paper, a block copolymer sealing layer next to the glass scrim, a non-woven polyester mat next to the mica, and a layer of mica dust on that side of the polyester opposite the mica paper.

4. An electrical insulation tape comprising a sheet of mica paper impregnated with a mixture of B-staged polybutadiene polymer and about 0.1% to about 0.35% by weight based on the weight of mica present of a monoalkoxy titanate, a woven glass scrim next to the mica paper, a block copolymer sealing layer next to the glass scrim, and a layer of release paper next to the mica paper on that side of the tape opposite the glass scrim.

5. The electrical insulation tape of claim 4 including a layer of mica dust between the release paper and the mica paper.

6. The electrical insulation tape of claims 1, 3 or 4 wherein the titanate is isopropyl-trimethacryl titanate, isopropyl-tri(dioctylpyrophosphato) titanate, or mixtures thereof.

7. The electrical insulation tape of claims 1, 3 or 4 wherein the titanate is a mixture of 50% by weight isopropyl-trimethacryl titanate, and 50% by weight isopropyl-tri(dioctylpyrophosphato) titanate.

* * * * *